US010803657B2

(12) United States Patent
Neubauer et al.

(10) Patent No.: US 10,803,657 B2
(45) Date of Patent: Oct. 13, 2020

(54) METHOD, APPARATUS, AND COMPUTER PROGRAM PRODUCT FOR DYNAMIC FLIGHT RANGE VISUALIZATION

(71) Applicant: HERE Global B.V., Eindhoven (NL)

(72) Inventors: Nicolas Neubauer, Berlin (DE); Daniel Gonzalez, Berlin (DE); Johannes Koblenz, Berlin (DE); Jan Niederhumer, Berlin (DE)

(73) Assignee: HERE Global B.V., Eindhoven (NL)

( * ) Notice: Subject to any disclaimer, the term of this patent is extended or adjusted under 35 U.S.C. 154(b) by 66 days.

(21) Appl. No.: 16/107,366

(22) Filed: Aug. 21, 2018

(65) Prior Publication Data

US 2020/0066031 A1 Feb. 27, 2020

(51) Int. Cl.
*G06T 17/05* (2011.01)
*G01C 23/00* (2006.01)

(52) U.S. Cl.
CPC .............. *G06T 17/05* (2013.01); *G01C 23/00* (2013.01)

(58) Field of Classification Search
None
See application file for complete search history.

(56) References Cited

U.S. PATENT DOCUMENTS

| | | | |
|---|---|---|---|
| 8,897,932 B2 | 11/2014 | Komatsuzaki et al. | |
| 9,126,696 B1* | 9/2015 | Hampel | B64D 45/00 |
| 9,170,126 B2 | 10/2015 | Schulte et al. | |
| 9,688,403 B2 | 6/2017 | Winn et al. | |
| 9,759,577 B2 | 9/2017 | Stabile | |
| 9,864,372 B2 | 1/2018 | Chen et al. | |
| 2015/0142211 A1 | 5/2015 | Shehata et al. | |
| 2016/0068267 A1* | 3/2016 | Liu | B64C 39/024 701/11 |
| 2016/0117853 A1* | 4/2016 | Zhong | B64C 39/024 345/634 |
| 2018/0108260 A1* | 4/2018 | Kuhara | G01C 21/20 |
| 2018/0143627 A1* | 5/2018 | Lee | B64C 39/024 |
| 2018/0149493 A1* | 5/2018 | Bleeg | G01C 23/005 |
| 2018/0321676 A1* | 11/2018 | Matuszeski | G05D 1/0055 |
| 2019/0127067 A1* | 5/2019 | Parrello | G05D 1/102 |
| 2019/0196467 A1* | 6/2019 | Aldana Lopez | G05D 1/0202 |
| 2019/0265705 A1* | 8/2019 | Zhang | B64C 39/024 |
| 2019/0318636 A1* | 10/2019 | Gu | G01C 21/20 |

FOREIGN PATENT DOCUMENTS

WO    WO 2016/193203 A1    12/2016

\* cited by examiner

*Primary Examiner* — Ryan M Gray
(74) *Attorney, Agent, or Firm* — Alston & Bird LLP

(57) ABSTRACT

A mapping system, computer program product and method provide visualization of the dynamic range of an aircraft. A method may include: receiving map data, where the map data includes a three-dimensional terrain map of a geographic region; determining a location of an aerial vehicle; calculating a plurality of points in a plurality of different direction that can be reached by the aerial vehicle within at least two predetermined increments of energy consumption; and providing for display of a map of the geographic region including an isoline through the plurality of points for each of the at least two predetermined increments of energy consumption representing a dynamic range of the aerial vehicle for the at least two predetermined increments of energy consumption.

20 Claims, 9 Drawing Sheets

METHOD, APPARATUS, AND COMPUTER PROGRAM PRODUCT FOR DYNAMIC FLIGHT RANGE VISUALIZATION

TECHNOLOGICAL FIELD

An example embodiment of the present invention relates to establishing a range of an aerial vehicle, and more particularly, to dynamically establishing a range for an aerial vehicle in consideration of environmental factors and geographical information, and providing a visualization of the range in an easily intelligible manner.

BACKGROUND

The distance a person or vehicle can travel before requiring additional fuel or energy, otherwise known as range, is a metric of high complexity and significant variability. Understanding range is of great importance for vehicles of all kinds. Understanding range can be useful when plotting routes for a vehicle including potential fueling or charging stops.

BRIEF SUMMARY

A method, apparatus, and computer program product are provided in accordance with an example embodiment for dynamic range visualization for an aerial vehicle. Embodiments may provide a mapping system having a memory with map data stored therein. The map data may include a three dimensional terrain map of a geographic region. The mapping system may also include processing circuitry configured to: determine a location of an aerial vehicle; calculate a plurality of points in perpendicular plurality of different directions that can be reached by the aerial vehicle within at least two predetermined increments of energy consumption; and provide for display of a map of the geographic region including an isoline through the plurality of points for each of the at least two predetermined increments of energy consumption representing a dynamic range of the aerial vehicle for the at least two predetermined increments of energy consumption.

According to some embodiments, the processing circuitry configured to calculate the plurality of points in the plurality of different directions that can be reached may include processing circuitry configured to: discretize the geographic region into a grid of nodes; define a routing graph that connects all neighboring nodes to each other; calculate an energy consumption cost of traveling between neighboring nodes; and determine a plurality of nodes that can be reached based on a cumulative energy consumption cost of the at least two predetermined increments of energy consumption, where the plurality of nodes that can be reached by a first predetermined increment of energy are joined as points along a first isoline, and where the plurality of nodes that can be reached by a second predetermined increment of energy are joined as points along a second isoline. The processing circuitry configured to calculate an energy consumption cost of traveling between neighboring nodes may include processing circuitry configured to: compute the Euclidean distance between each neighboring node pair; calculate the energy consumption cost of traveling between each neighboring node pair along the Euclidean distance; augment the energy consumption cost of traveling between each neighboring node pair based on a determined wind speed and wind direction proximate the respective neighboring node pair; and augment the energy consumption cost of traveling between each neighboring node pair based on a determined elevation change between the nodes of a respective neighboring node pair.

The map data may include building information, where the three dimensional terrain map of a region includes representations of buildings in the geographic region. The processing circuitry configured to calculate the plurality of points in the plurality of different direction that can be reached may include processing circuitry configured to: determine a height of a building in response to the building being along at least one of the plurality of different directions; calculate points that can be reached by the aerial vehicle within the at least two predetermined increments of energy consumption based on a path around the building in response to the building being above a predetermined height; and calculate points that can be reached by the aerial vehicle within the at least two predetermined increments of energy consumption based on a path over the building in response to the building being below a predetermined height. The processing circuitry configured to calculate the plurality of points in the plurality of different directions that can be reached by the aerial vehicle within at least two predetermined increments of energy consumption may include processing circuitry configured to: calculate the plurality of points in the plurality of different directions that can be reached by the aerial vehicle within at least two predetermined increments of energy consumption based on maintaining a predetermined minimum height above the terrain.

The map data of some embodiments may include no-fly zone information, where the three dimensional terrain map of the geographic region includes representations of no-fly zones in the geographic region. The processing circuitry configured to calculate the plurality of points in the plurality of different directions that can be reached by the aerial vehicle within at least two predetermined increments of energy consumption may include processing circuitry configured to: calculate points that can be reached by the aerial vehicle within the at least two predetermined increments of energy consumption based on a path around the no fly zone. The processing circuitry configured to calculate the plurality of points in the plurality of different directions that can be reached by the aerial vehicle within at least two predetermined increments of energy consumption may include processing circuitry configured to: calculate the plurality of points in the plurality of different directions that can be reached by the aerial vehicle within at least two predetermined increments of energy consumption factoring in a return trip from the plurality of points to a designated landing location.

Embodiments may provide a computer program product including at least one non-transitory computer-readable storage medium having computer-executable program code instructions stored therein, the computer-executable program code instructions including program code instructions to: retrieve map data including a three-dimensional terrain map of a geographic region; determine a location of an aerial vehicle within the geographic region; calculate a plurality of points in a plurality of different directions that can be reached by the aerial vehicle within at least two predetermined increments of energy consumption; and provide for display of a map of the geographic region including an isoline through the plurality of points for the at least two predetermined increments of energy consumption representing a dynamic range of the aerial vehicle for the at least two predetermined increments of energy consumption.

According to some embodiments, the program code instructions to calculate the plurality of points in the plurality of different directions that can be reached includes program code instructions to: discretize the geographic region into a grid of nodes; define a routing graph that connects all neighboring nodes to each other; calculate an energy consumption cost of traveling between neighboring nodes; and determine a plurality of nodes that can be reached based on a cumulative energy consumption cost of the at least two predetermined increments of energy consumption, where the plurality of nodes that can be reached by a first predetermined increment of energy are joined as points along a first isoline, and where the plurality of nodes that can be reached by a second predetermined increment of energy are joined as points along a second isoline. The program code instructions to calculate an energy consumption cost of traveling between neighboring nodes may include program code instructions to: compute the Euclidean distance between each neighboring node pair; calculate the energy consumption cost of traveling between each neighboring node pair along the Euclidean distance; augment the energy consumption cost of traveling between each neighboring node pair based on a determined wind speed and wind direction proximate the respective neighboring node pair; and augment the energy consumption cost of traveling between each neighboring node pair based on a determined elevation change between the nodes of a respective neighboring node pair.

According to some embodiments, the map data may include building information, where the three dimensional terrain map of the geographic region includes representations of buildings in the geographic region. The program code instructions to calculate the plurality of points in the plurality of different directions that can be reached may include program code instructions to: determine a height of a building in response to the building being along at least one of the plurality of different directions; calculate points that can be reached by the aerial vehicle within the at least two predetermined increments of energy consumption based on a path around the building in response to the building being above a predetermined height; and calculate points that can be reached by the aerial vehicle within the at least two predetermined increments of energy consumption based on a path over the building in response to the building being below a predetermined height. The map data may include no-fly zone information, where the three dimensional terrain map of the geographic region includes representations of no-fly zones in the geographic region, where the program code instructions to calculate the plurality of points in the plurality of different directions that can be reached includes program code instructions to: calculate points that can be reached by the aerial vehicle within the at least two predetermined increments of energy consumption based on a path around the no-fly zone.

The program code instructions to calculate the plurality of points in the plurality of different directions that can be reached by the aerial vehicle within at least two predetermined increments of energy consumption may include program code instructions to: calculate the plurality of points in the plurality of different directions that can be reached by the aerial vehicle within at least two predetermined increments of energy consumption based on maintaining a predetermined minimum height above the terrain. The program code instructions to calculate the plurality of points in the plurality of different directions that can be reached by the aerial vehicle within at least two predetermined increments of energy consumption may include program code instructions to: calculate the plurality of points in the plurality of different directions that can be reached by the aerial vehicle within at least two predetermined increments of energy consumption factoring in a return trip from the plurality of points to a designated landing location.

Embodiments described herein may provide a method including: receiving map data, where the map data includes a three-dimensional terrain map of a geographic region; determining a location of an aerial vehicle; calculating a plurality of points in a plurality of different direction that can be reached by the aerial vehicle within at least two predetermined increments of energy consumption; and providing for display of a map of the geographic region including an isoline through the plurality of points for each of the at least two predetermined increments of energy consumption representing a dynamic range of the aerial vehicle for the at least two predetermined increments of energy consumption. Calculating the plurality of points in the plurality of different directions that can be reached may include: discretizing the geographic region into a grid of nodes; defining a routing graph that connects all neighboring nodes to each other; calculating an energy consumption cost of traveling between neighboring nodes; and determining a plurality of nodes that can be reached based on a cumulative energy consumption cost of the at least two predetermined increments of energy consumption, where the plurality of nodes that can be reached by a first predetermined increment of energy are joined as points along a first isoline, and where the plurality of nodes that can be reached by a second predetermined increment of energy are joined as points along a second isoline.

According to some embodiments, calculating an energy consumption cost of traveling between neighboring nodes may include: computing the Euclidean distance between each neighboring node pair; calculating the energy consumption cost of traveling between each neighboring node pair along the Euclidean distance; augmenting the energy consumption cost of traveling between each neighboring node pair based on a determined wind speed and wind direction proximate the respective neighboring node pair; and augmenting the energy consumption cost of traveling between each neighboring node pair based on a determined elevation change between the nodes of a respective neighboring node pair. The map data may include building information where the three dimensional terrain map of the geographic region includes representations of buildings in the geographic region. Calculating the plurality of points in the plurality of different directions that can be reached may include: determining a height of a building in response to the building being along at least one of the plurality of different directions; calculating points that can be reached by the aerial vehicle within the at least two predetermined increments of energy consumption based on a path around the building in response to the building being above a predetermined height; and calculating points that can be reached by the aerial vehicle within the at least two predetermined increments of energy consumption based on a path over the building in response to the building being below a predetermined height.

Embodiments described herein may provide an apparatus including: means for receiving map data, where the map data includes a three-dimensional terrain map of a geographic region; means for determining a location of an aerial vehicle; means for calculating a plurality of points in a plurality of different directions that can be reached by the aerial vehicle within at least two predetermined increments of energy consumption; and means for providing for display of a map of the geographic region including an isoline through the plurality of points for each of the at least two predetermined increments of energy consumption representing a dynamic range of the aerial vehicle for the at least two predetermined increments of energy consumption. The means for calculating the plurality of points in the plurality of different directions that can be reached may include: means for discretizing the geographic region into a grid of nodes; means for defining a routing graph that connects all neighboring nodes to each other; calculating an energy consumption cost of traveling between neighboring nodes; and means for determining a plurality of nodes that can be reached based on a cumulative energy consumption cost of the at least two predetermined increments of energy consumption, where the plurality of nodes that can be reached by a first predetermined increment of energy are joined as points along a first isoline, and where the plurality of nodes that can be reached by a second predetermined increment of energy are joined as points along a second isoline.

According to some embodiments, the means for calculating an energy consumption cost of traveling between neighboring nodes may include: means for computing the Euclidean distance between each neighboring node pair; means for calculating the energy consumption cost of traveling between each neighboring node pair along the Euclidean distance; means for augmenting the energy consumption cost of traveling between each neighboring node pair based on a determined wind speed and wind direction proximate the respective neighboring node pair; and means for augmenting the energy consumption cost of traveling between each neighboring node pair based on a determined elevation change between the nodes of a respective neighboring node pair. The map data may include building information where the three dimensional terrain map of the geographic region includes representations of buildings in the geographic region. The means for calculating the plurality of points in the plurality of different directions that can be reached may include: means for determining a height of a building in response to the building being along at least one of the plurality of different directions; means for calculating points that can be reached by the aerial vehicle within the at least two predetermined increments of energy consumption based on a path around the building in response to the building being above a predetermined height; and means for calculating points that can be reached by the aerial vehicle within the at least two predetermined increments of energy consumption based on a path over the building in response to the building being below a predetermined height.

BRIEF DESCRIPTION OF THE DRAWINGS

Figure 1:
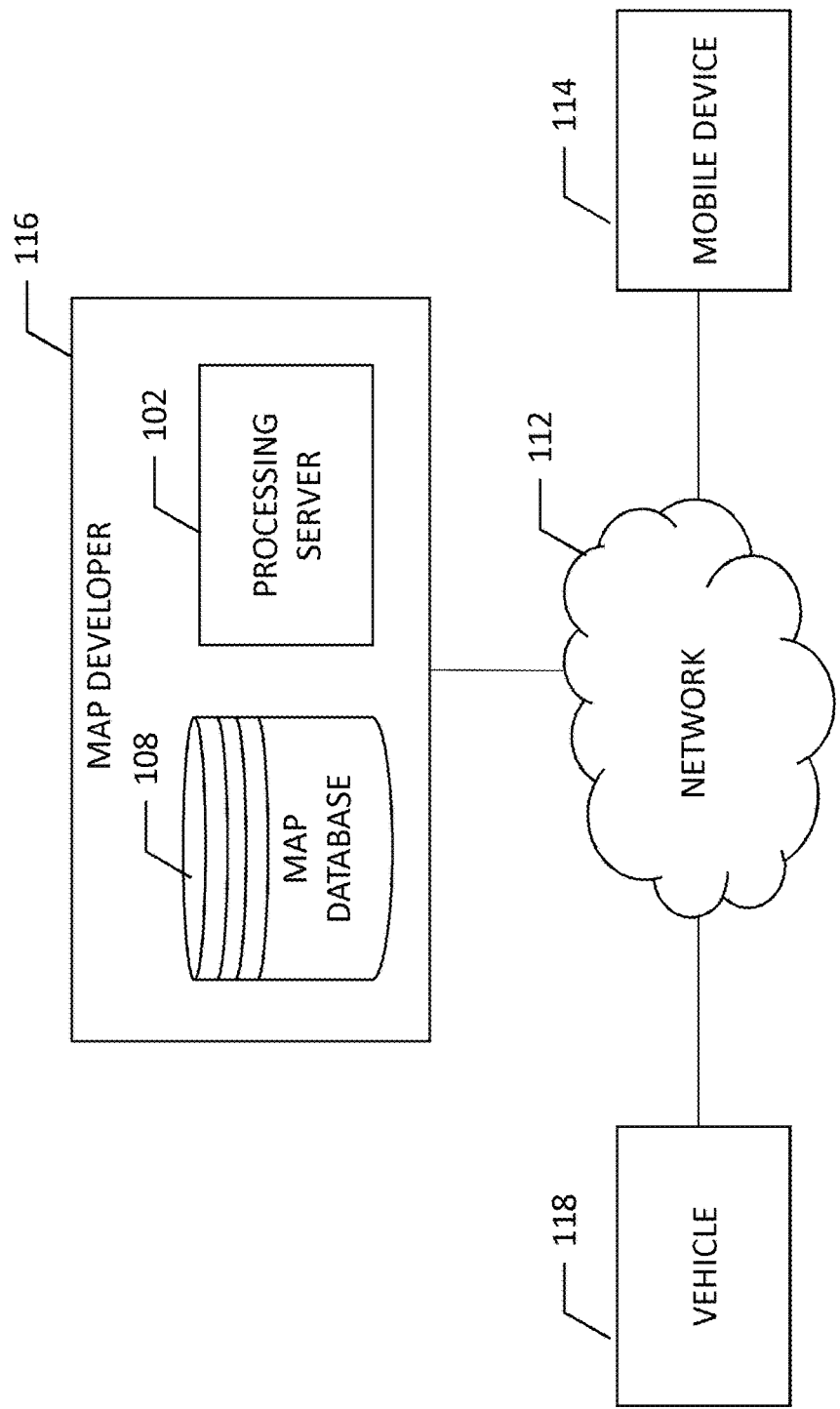
Figure 2:
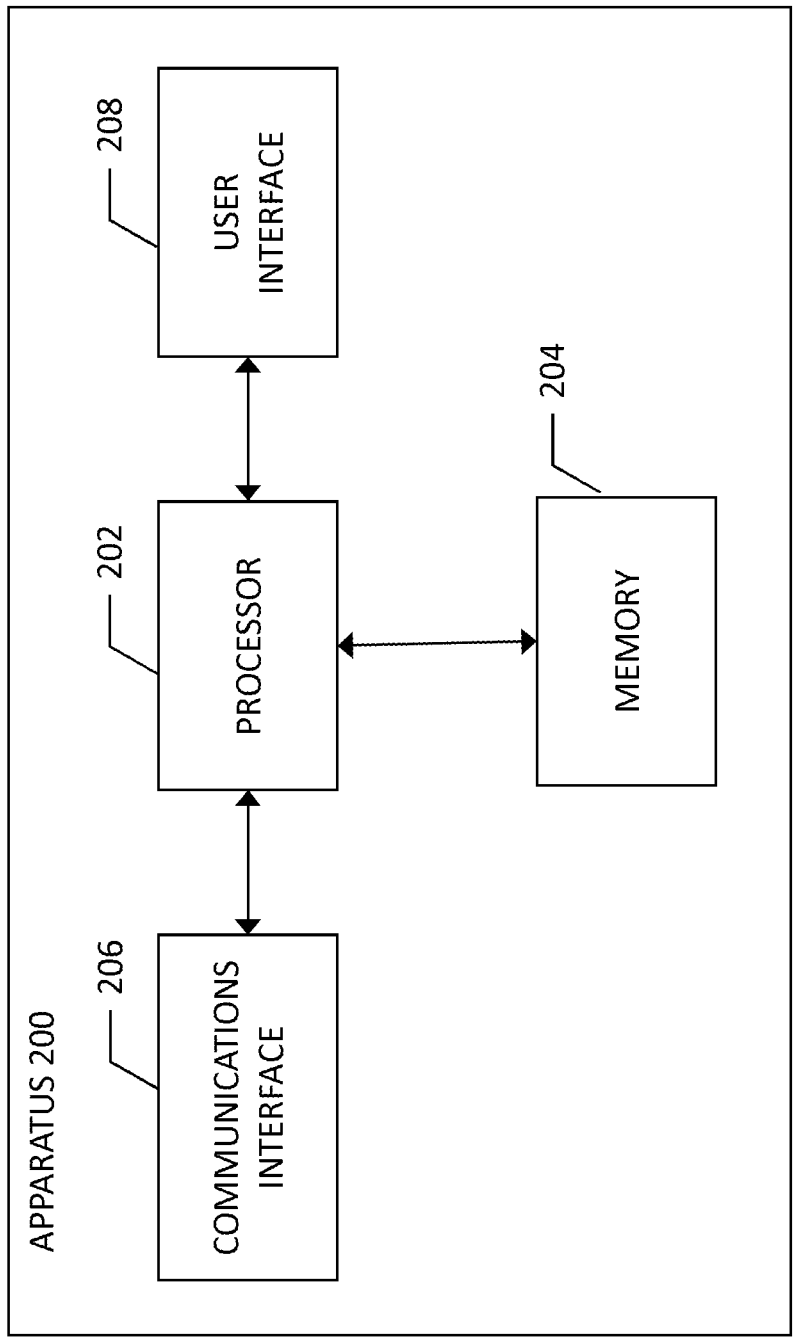
Figure 3:
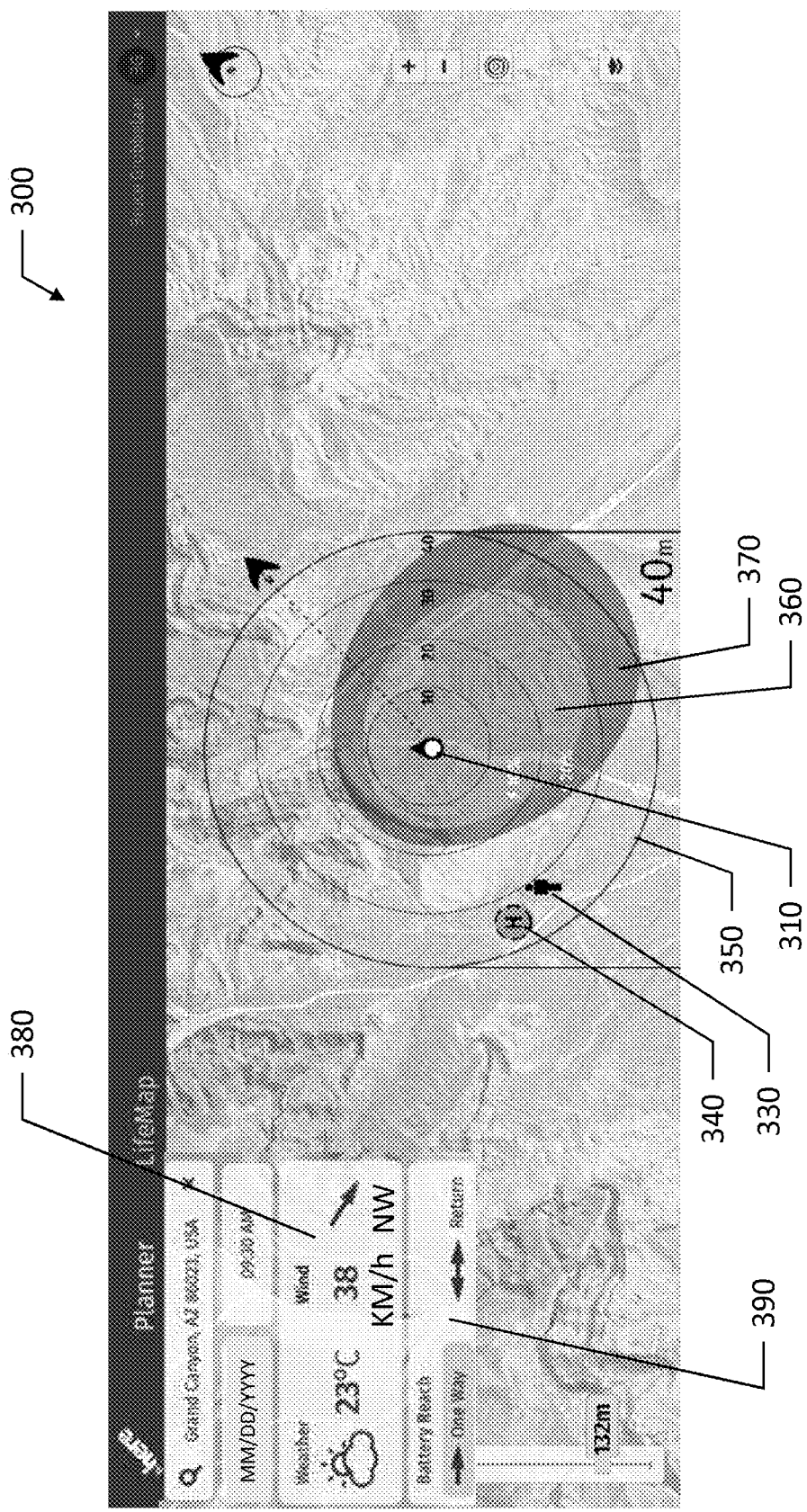
Figure 4:
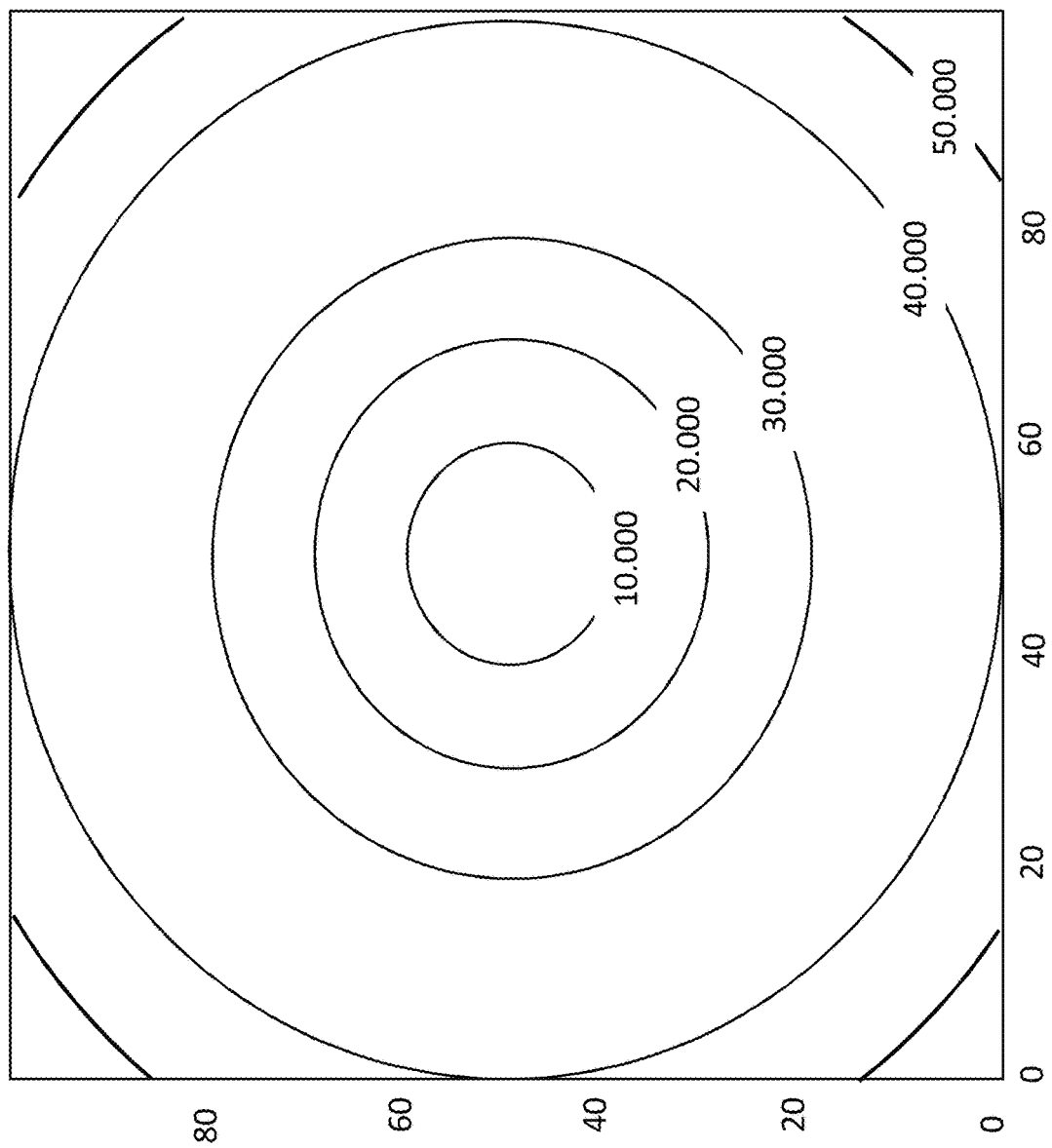
Figure 5:
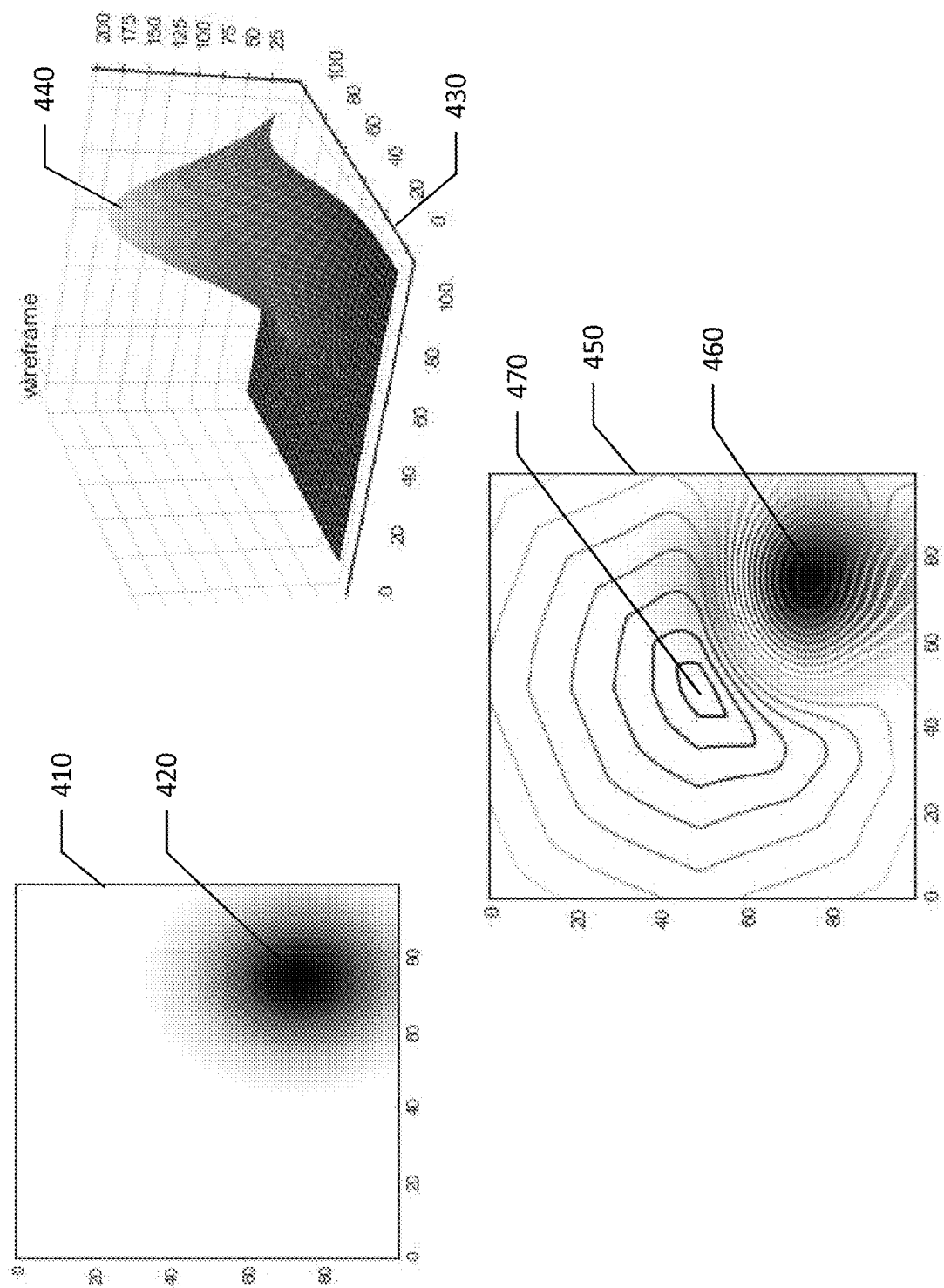
Figure 6:
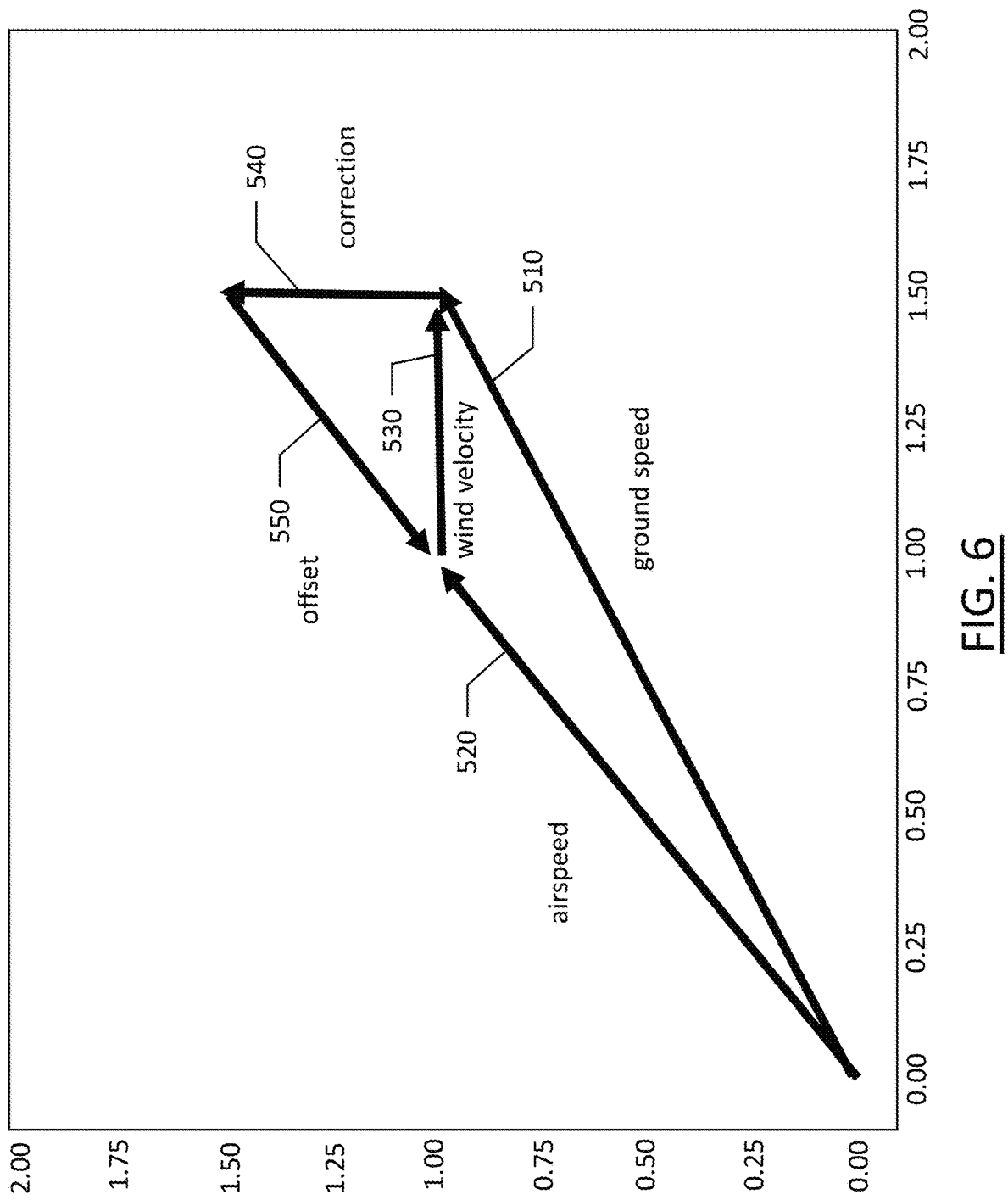
Figure 7:
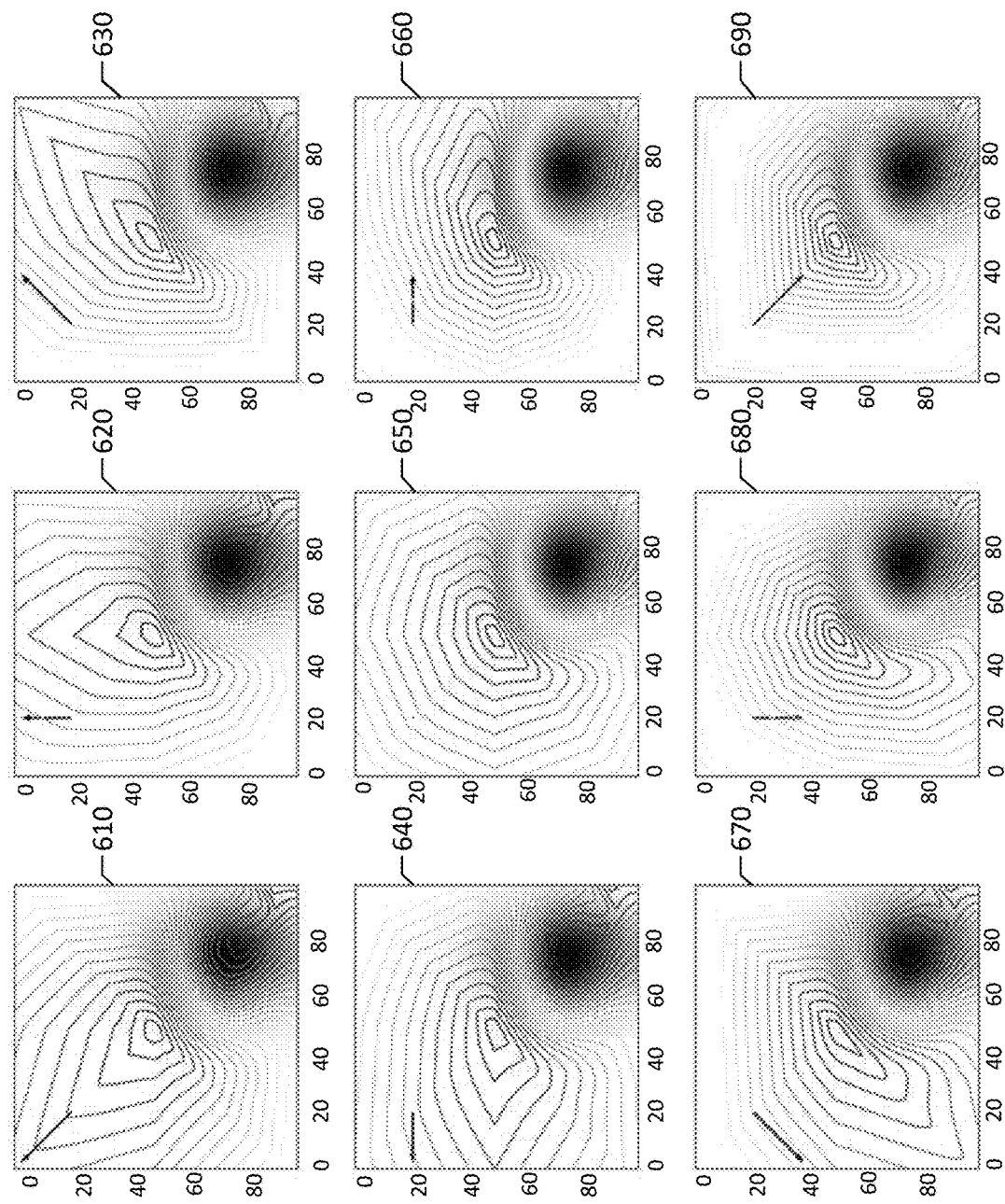
Figure 8:
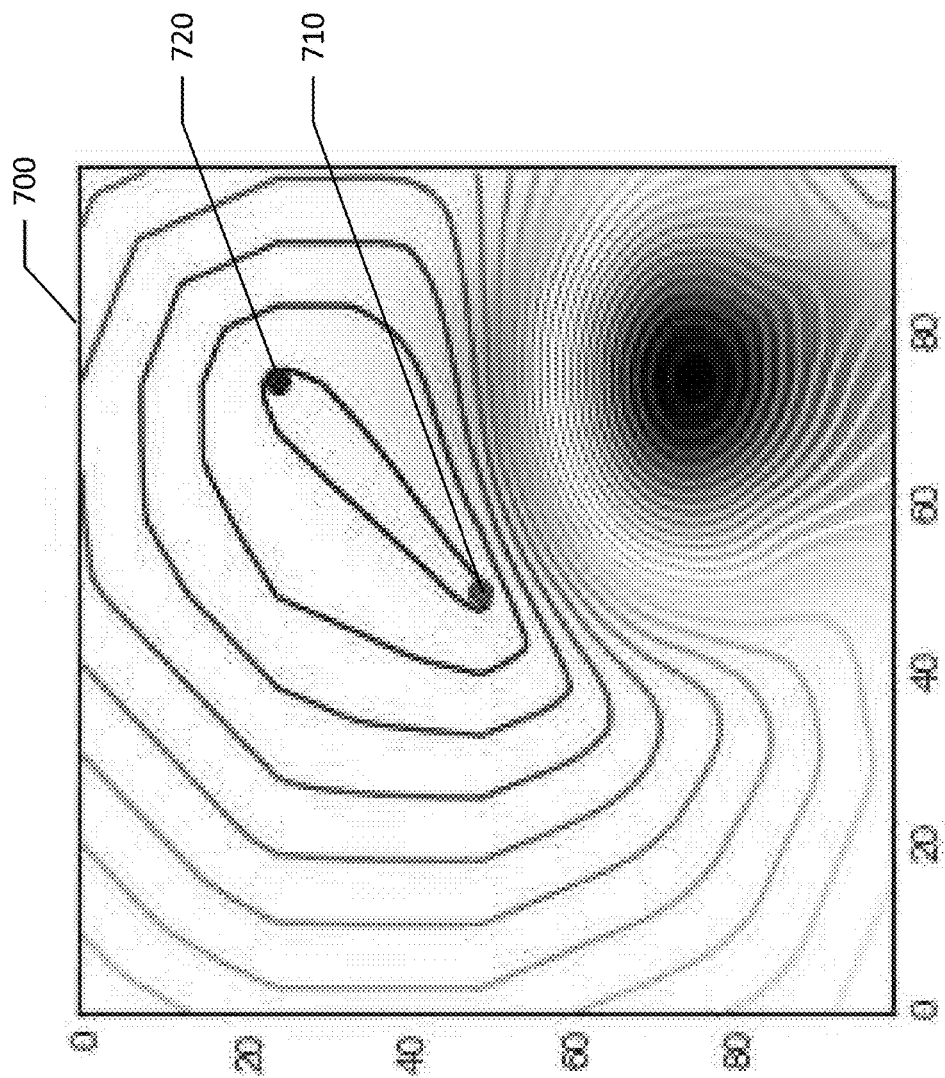
Figure 9:
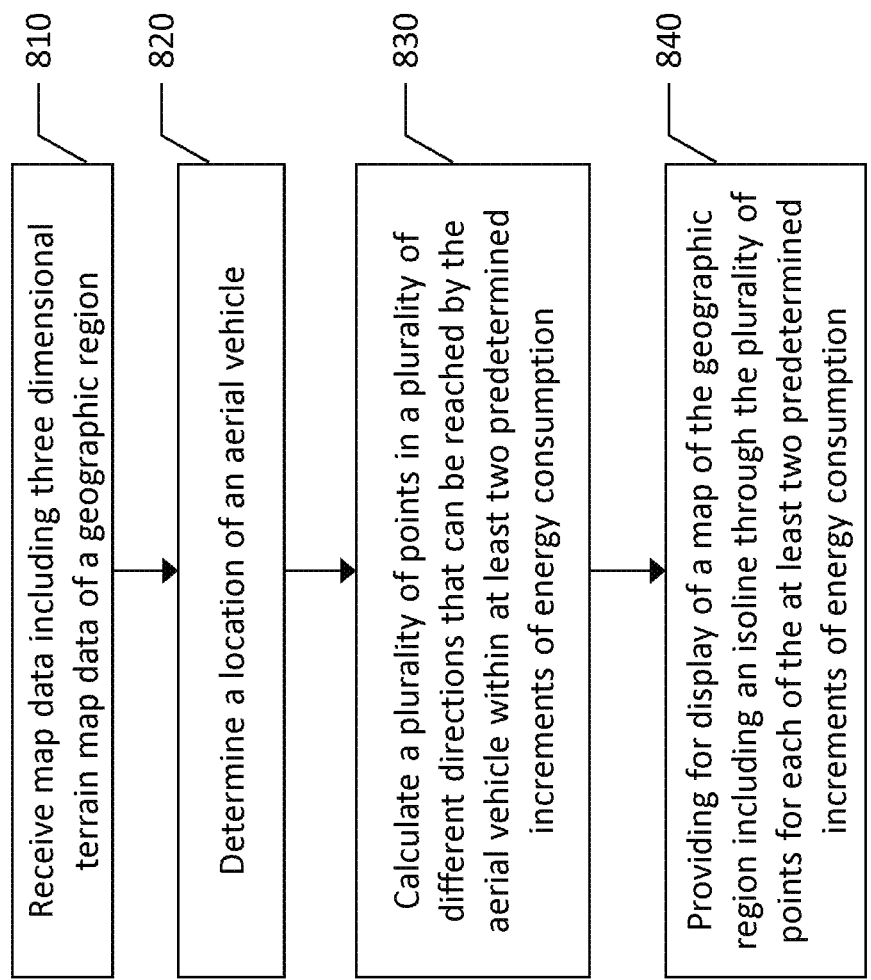

Having thus described example embodiments of the invention in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for dynamic flight range visualization in accordance with an example embodiment of the present disclosure;

FIG. 3 illustrates a map including isolines representing a range of an aerial vehicle according to an example embodiment of the present disclosure;

FIG. 4 depicts a graphical illustration of isolines in increments of energy required to reach a respective isoline according to an example embodiment of the present disclosure;

FIG. 5 illustrates a two-dimensional and three-dimensional representation of terrain of a geographical region together with calculated isolines depicting the range of an aerial vehicle from an origin location according to an example embodiment of the present disclosure;

FIG. 6 depicts the effects of wind speed and direction on a flight path in establishing the range of an aerial vehicle according to an example embodiment of the present disclosure;

FIG. 7 illustrates a plurality of isoline plots for the terrain of the geographical region of FIG. 5 as affected by differing wind speed and wind direction conditions according to an example embodiment described herein;

FIG. 8 illustrates a plurality of isoline plots for the terrain of the geographical region of FIG. 5 including a predetermined landing destination for the aerial vehicle according to an example embodiment of the present disclosure; and FIG. 9 is a flowchart of a method for generating and presenting dynamic flight range visualization to a user according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for dynamically establishing the range of an aerial vehicle and providing a visualization of that range to a user. FIG. 1 illustrates a communication diagram of an example embodiment of a system for implementing example embodiments described herein. The illustrated embodiment of FIG. 1 includes a map developer system 116, a processing server 102 in data with communication a geographic map database, e.g., map database 108 through a network 112, and one or more mobile devices 114. The mobile device 114 may be associated, coupled, or otherwise integrated with a vehicle 118, such as an aerial vehicle including unmanned drones, helicopters, airplanes, etc. The mobile device 114 may optionally integrated as, for example, a navigation unit in an aerial vehicle, such as in a manned helicopter airplane, dirigible balloon, airship, or the like. Additional, different, or fewer components may be provided. For example, many mobile devices 114 and/or vehicles 118 may connect with the network 112. The map developer 116 may include computer systems and a network of a system operator. The processing server 102 may include the map database 108, such as a remote map server. The network may be wired, wireless, or any combination of wired and wireless communication networks, such as cellular, Wi-Fi, internet, local area networks, or the like.

Embodiments described herein may be implemented in autonomous, semi-autonomous, or non-autonomous vehicles. Autonomous vehicles may include vehicles that are guided entirely by software and hardware components, without requiring human interaction. Non-autonomous vehicles are vehicles that have no autonomy and require a human driver or pilot to perform all driving activities. Semi-autonomous vehicles are vehicles that fall anywhere between autonomous and non-autonomous vehicles, where there is some degree of autonomy, which may include any form of driver aid or pilot aid such as steering assistance, acceleration/deceleration assistance, adaptive cruise control, auto-pilot, etc. Autonomous vehicle routing may include causing the autonomous vehicle to follow a selected route, while a semi-autonomous or non-autonomous vehicle routing may involve providing navigational assistance or route guidance to a user to drive a vehicle along a selected route or to pilot an aerial vehicle along a route. Further, in the case of unmanned vehicles, a driver or pilot may not be within the vehicle, but may be located remotely, where the driver or pilot is associated with the mobile device 114 which may be located remotely from the vehicle 118.

Processing server 102 may be one or more fixed or mobile computing devices. The mobile device 114 may be configured to access the map database 108 via the processing server 102 through, for example, a mapping application, such that the user equipment may provide navigational assistance to a user among other services provided through access to the map developer 116.

For terrestrial vehicles, such as cars, trucks, etc., the map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The links or roadways may be represented by polylines, where each polyline comprises a plurality of vertices establishing the path of the roadway geometry. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

With respect to aerial vehicles, such as unmanned drones, helicopters, airplanes, airships, etc., the map database 108 may include a multi-dimensional map including terrain information and object information, where the object information may include information regarding the location and size of objects extending above ground level, where the objects may be in uncontrolled airspace, and where the object information may include a height above ground level of at least some of the objects and an altitude of the ground level of a respective area. Terrain information may include information such as terrain elevation, terrain type (e.g., land, water, type of terrain such as heavily treed, lightly treed, meadow, sand, wetland, etc.), and permissions associated with the terrain. Permissions associated with an area may include ownership such as public lands or private lands, with an indication of whether landing of an aerial vehicle is allowed or possible, which may also depend on the type of aerial vehicle. The map database may also include information regarding roadways as described above, and points of interest, which may both be relevant to aerial vehicles. Points of interest may include buildings, structures, roadway overpasses, bridges, tunnels, etc. The three-dimensional characteristics of these points of interest may optionally be included in the map database, such as a building footprint and height, or specific profile, or a bridge height above the terrain or water below, or the elevation of any object that may extend above the ground level of the terrain.

Map database 108 may include information relevant to aerial vehicles that may not be relevant to terrestrial vehicles, such as object information regarding specific objects, such as trees, buildings, billboards, radio towers, etc. Information regarding these objects may include location information (relative to the terrain information, for example), size information (e.g., length and width on the ground), height above ground level information, and possibly other information relating to their impact on an aerial route above or around the object. The map database 108 may also include information relevant to aerial navigation, such as restricted airspace around airports, population hubs, sports arenas, train stations, gas stations, national parks, or other airspace that may be otherwise restricted. Further, some airspace restrictions may have a temporal component, such as sporting arenas which may only have restricted airspace during events, or geographic areas that have airspace restrictions based on dignitary travel or events, where those geographic areas typically do not have airspace restrictions. The map database 108 may be updated by governmental databases such as state or federal databases which update airspace restrictions periodically. Further, governmental regulations may be periodically updated and such updates may be cascaded to the map database, based on restrictions associated with different types of aircraft and different geographic locations.

The map database 108 may be maintained by a content provider e.g., a map developer. By way of example, the map developer can collect geographic data to generate and enhance the map database 108. According to some embodiments, the map database 108 may delegate map generation and revision to other devices, such as mobile device 114. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to aerial travel, example embodiments or components thereof may be implemented for vehicular travel along roadways, pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example. Optionally, a portion of the map database 108, such as map data regarding a specific roadway, may be downloaded or stored temporarily on an end user device, and according to various embodiments described herein, the mobile device 114 may be configured to modify the map data regarding a roadway before sending the map data back to the map database 108.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. The mobile device is configured to provide navigation and map functions such as guidance and map display, for example, and to determine one or more personalized routes or route segments based on one or more calculated and recorded routes, according to some example embodiments.

The vehicle 118, which may be associated with mobile device 114 or have mobile device 114 integrated therein may be any type of vehicle, such as an unmanned aerial vehicle, a helicopter, airplane, airship, or the like. Further, embodiments or portions thereof may be implemented in terrestrial vehicles, such that vehicle 118 may be a road going vehicle.

The processing server 102 may receive probe data from a mobile device 114 or a device in communication with mobile device 114. The mobile device 114 may include one or more detectors or sensors as a positioning system built or embedded into or within the interior of the mobile device 114. Alternatively, the mobile device 114 uses communications signals for position determination. The mobile device 114, particularly when integrated with vehicle 118, may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

Optionally, the vehicle 118 may include locating means such as a global positioning system, or other locating means as described above while mobile device 114 may be remotely located from the vehicle 118. The vehicle 118 may be capable of reporting location to the map developer 116 and/or mobile device 114 for implementations of the embodiments described herein.

More specifically, probe data (e.g., collected by mobile device 114 and/or vehicle 118) is representative of the location of a vehicle 118 at a respective point in time and may be collected while a vehicle is moving or stationary. According to the example embodiment described below with the probe data being from aerial vehicles traveling above ground, the probe data may include, without limitation, location data, (e.g. a latitudinal, longitudinal position, and/or height/altitude, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114 and/or vehicle 118, may be or include any device capable of collecting the aforementioned probe data. Some examples may include specialized vehicle mapping equipment, navigational systems, mobile devices, such as phones or personal data assistants, or the like.

An example embodiment of a processing server 102 may be embodied in an apparatus 200 as illustrated in FIG. 2. The apparatus 200, such as that shown in FIG. 2, may be specifically configured in accordance with an example embodiment of the present invention for dynamically estimating the range of a vehicle. The apparatus 200, which may be embodied in the vehicle 118 or mobile device 114 may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus 200. The memory device 204 may be non-transitory and may include, for example, one or more volatile and/or non-volatile memories. In other words, for example, the memory device 204 may be an electronic storage device (for example, a computer readable storage medium) comprising gates configured to store data (for example, bits) that may be retrievable by a machine (for example, a computing device like the processor 202). The memory device 204 may be configured to store information, data, content, applications, instructions, or the like, for enabling the apparatus 200 to carry out various functions in accordance with an example embodiment of the present invention. For example, the memory device 204 could be configured to buffer input data for processing by the processor. Additionally or alternatively, the memory device 204 could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment of a mobile device 114 or vehicle 118 capable of performing methods described herein may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Aerial vehicle travel has evolved from airplanes and helicopters that typically travel well above the altitude at which they would encounter ground-based objects to aerial vehicles that can travel at very low altitudes where terrestrial objects are present. Features described herein use a multi-dimensional map to facilitate safe navigation above the ground, but below conventionally controlled airspace such as that defined by the United States Federal Aviation Authority, the European Joint Aviation Authority, or similar national authority protected airspace for commercial airline traffic. More specifically, embodiments described herein are well suited for estimating the range of an aerial vehicle in an airspace where objects extend upward from the ground, such as houses, buildings, radio towers, etc., such as just above ground level, up to around two thousand feet depending upon the height of the tallest buildings, towers, and geographic features within a region.

Aerial vehicle travel by manned airplane typically is performed at high altitudes above the earth where there are no obstructions to flight other than other aircraft. The safety of travel via airplane is governed by strict air traffic control protocols in controlled airspace. Controlled airspace is airspace of defined dimensions within which Air Traffic Control (ATC) services are provided. The level of control varies with different classes of airspace. Uncontrolled airspace is the opposite of controlled airspace. The international Civil Aviation Organization (ICAO) classifies airspace in seven classes from A to G. Controlled airspace is in classes A to E, in order of decreasing ATC regulation of flights. Uncontrolled airspace includes classes F and G. Outside of emergency situations, the only time ground obstructions may be a factor are times when an airplane is departing or arriving at an airport. Obstructions near such locations are strictly regulated and any obstructions, even temporary ones, which may affect safe air travel are charted to notify pilots of their locations and potential issues.

Embodiments described herein may involve the flight of unmanned aircraft systems (UAS) in uncontrolled airspace. As used herein, UAS uncontrolled airspace generally refers to airspace in classes F or G, and in an area where ground obstructions are normally present. This UAS uncontrolled airspace is airspace in which manned commercial aircraft typically do not fly, such as between buildings or a matter of feet above treetops, for example. Manned aerial vehicles (such as fixed wing and variable wing) do not ordinarily travel in this type of UAS uncontrolled airspace, except possibly during takeoff or landing which may generally be performed in controlled airspace corridors for takeoff and landing, or perhaps military aircraft during combat and helicopters during police or medical emergencies, or helicopters associated with news stations.

Unmanned aerial vehicles (UAVs) or drones are becoming commonplace tools for different applications in different fields. Drones on different types of missions are dependent upon their on-board power supply, be it electric or combustion fuel, and seldom offer the possibility of in-air refueling. In current drone operation software, information pertaining to the available range of a UAV is generally reported only as percentage of battery remaining.

Energy use of UAVs is largely dependent upon the UAV's weight, aerodynamic properties, and engine/motor power draw. Further, battery power decreases non-linearly depending upon the charging status, and temperature can influence battery life as well. These factors are relatively constant for a given drone and battery model and may be approximated as constants or functions of other factors such as temperature, such that a rough translation from battery status to meters of range can be derived. In order to compute the locations that can effectively be reached from a given position and with a given charge status, more dynamic factors may play a role as well. These factors may mean that the energy spent to reach a particular point is different from its Euclidean two-dimensional (2D) distance.

Beyond the substantially two-dimensional movement associated with vehicles traveling along a road network, UAVs may include ascent and descent along a path to avoid objects or geographic features, and/or to maintain a consistent level above the ground. Map data of example embodiments may include digital elevation models (DEMs) to provide a gridded height map of the area of interest and these DEMs may be available in a variety of resolutions which may depend upon the object density or elevation change rate within the area of interest. Buildings may be maintained in the map database as a special sort of terrain in the aggregate, particularly when outside of an immediate vicinity of a UAV, but may optionally be treated individually when a UAV is proximate the buildings to avoid being too close to a building, which may be both unsafe and may violate local flight restrictions (e.g., relative to privacy around high-rise apartments). Regulatory aspects may be incorporated such as no-fly zones around airports or military bases, such that routes generated through three-dimensional space may not only consider obstacles and terrain, but also open space that is restricted. In this manner, no-fly zones may be treated as buildings where flight paths through the no-fly zones are restricted as non-possible routes.

Beyond obstacles and terrain, the movement of UAVs over ground may be affected by wind, particularly due to the light weight nature of many UAVs and their vulnerability to the forces of winds altering their trajectories. Wind may increase or decrease energy use based on the angle between the wind and the flight direction. Wind measurements from weather stations may be used by example embodiments herein to aid in the calculation of the range of a UAV as it travels along a path.

Determining the range of terrestrial vehicles such as cars and trucks may be relatively easy to gauge based on fuel remaining or battery charge remaining, and a historical average fuel/energy consumption of the vehicle, and such estimation may also be relatively low-risk as the consequences of running out of fuel or energy are relatively mild, and may typically risk primarily stranding a user. However, determining the range of aircraft is much more critical and has more dire consequences. Further, light weight aircraft such as UAVs may have a range that fluctuates to a considerably higher degree than terrestrial vehicles. A UAV operator in a commercial application may face the problem of managing the available flight range of the UAV while maximizing the coverage area of the flight. Providing a battery/fuel tank status percentage, a flight range (in distance or time) may only provide a superficial indication of how long the UAV may remain airborne. Consequently, UAV range may be conservatively under estimated to ensure safe return/landing of the UAV while sacrificing flight time and requiring more stops between flights to charge batteries or to refuel. This may result in an increase of the cost of operation. Conversely, overestimating the range of a UAV may risk running out of fuel/energy before a flight is complete and failing to return the UAV to a planned landing location. Applicant provides herein a method, apparatus, and compute program product to provide a more accurate dynamic flight range calculation and visualization to an operator of the UAV based on the actual terrain, regulatory restrictions, and wind/weather conditions that the UAV will encounter during the flight.

Example embodiments described herein provide dynamic range calculation for an aerial vehicle, such as a UAV, which considers the battery/fuel level, motor/engine energy requirements, wind speeds and directions, terrain, obstacles/buildings, no-fly zones, and whether a return route is necessary. Embodiments further provide a visualization of the dynamic range calculation. This visualization may be provided, for example, to a drone or UAV operator in a manner that provides a visual indication of the range of the aerial vehicle using isoline representations on a map of the geographic region in which the aerial vehicle is operating.

Calculation of the range of the aerial vehicle may prove computationally intensive such that it may not be performed on the aerial vehicle or at the aerial vehicle's controller, but may be performed at the map developer or in a cloud-based service. The cloud-based service may return the determined isolines as a vector for display on an operator's device, such as mobile device 114.

FIG. 3 illustrates an example embodiment of isoline visualization of range. As shown, a display 300 may present a current location 310 of an aerial vehicle, such as a drone or UAV in the illustrated embodiment. The display 300 also depicts the location of a user 330 which may be operating the UAV (e.g., vehicle 118) using a controller, such as mobile device 114. A takeoff/landing spot 340 is also illustrated. While the takeoff/landing spot 340 is illustrated proximate user 330, the user may be remotely located as they may be able to control the UAV remotely and see the UAV surroundings through sensors. Conventionally, a range for an aerial vehicle may be depicted as concentric circles surrounding the vehicle, as shown by 350. Those concentric circles may illustrate a distance that the vehicle may travel from its current location based on the available fuel or battery. The concentric circles may indicate an amount of time or an amount of fuel/battery expended at each circle. For example, the innermost concentric circle may be reached by the vehicle in a predefined time period, such as five minutes, or may consume a predefined amount, such as 10%, of the fuel or battery life to reach the inner most concentric circle. Each concentric circle thereafter may be a further increment of time or fuel/battery consumption, such as increments of a predefined length of time or a predefined amount of fuel or battery life, e.g., increments spaced at intervals of 5 minutes or 10% of fuel/battery life.

Embodiments described herein provide a more accurate depiction of range using a plurality, such as all, relevant variables relating to energy consumption and terrain as described above. In the illustrated embodiment of FIG. 3, the isolines that are more elliptically shaped 360 and 370 represent more accurate isolines than concentric circles. This may be due to environmental factors, such as wind, obstacles, terrain, etc. In the illustrated embodiment of FIG. 3, a wind speed and direction 380 is illustrated in the display 300, showing the wind at 38 kilometers per hour from the north west (NW) directed toward a south east (SE) direction. This wind results in a skewed isoline, enabling the UAV to travel further in a direction heading with the wind, and a much shorter travel distance ability in a direction against the wind. The isolines 360 and 370 reflect this influence of the wind, where isoline 360 may represent the distance that can be traveled using 10% of the total battery capacity, while isoline 370 illustrates the distance that may be traveled using 20% of the total battery capacity.

Embodiments described herein may further provide an indication of the available range of an aerial vehicle based on whether the aerial vehicle needs to return to a specific landing spot. Most UAVs use a single takeoff and landing point as they are deployed for reconnaissance, aerial photography, monitoring of geological or natural phenomena or creatures, or a variety of other uses in which a user deploys the UAV and necessitates a return of the UAV to the user. In the illustrated embodiment, range calculation may be established based on whether the range is to be one-way (i.e., not returning to a specific landing spot) or return (i.e., returning to a specific landing spot). In the illustrated embodiment of FIG. 3, an option for return or one-way is illustrated at 390. In the image of FIG. 3, the "one-way" battery reach option is selected such that the range is considered without leaving sufficient battery capacity to return to spot 340. If a return trip is required, this will influence the isolines as a range is established based on calculating a distance from the current location 310 to a position, but also a calculation is performed from that position back to the landing spot 340.

Isolines are used in routing may represent all points that can be reached from a given origin (e.g., 310) in the same amount of time or using the same amount of fuel/battery. Time-based isolines may also be called "isochrones". Due to environmental factors such as wind speed, obstacles, and terrain, isolines and isochrones may be considerably more distorted than one would obtain simply by considering Euclidean distance from the origin to a distance equivalent to the battery/fuel increment or time increment, which generally results in concentric circles.

Providing a display of isolines as described herein can provide an easily understood visualization of the range of an aerial vehicle by plotting the isoline that represents all points that can be reached using the remaining energy, increments of energy, or a threshold of energy. In the embodiment of FIG. 3, the inner isoline 360 may represent a safe level of energy depletion and the outer line 370 may represent a more aggressive level of energy depletion. A safe level of energy depletion may be user defined or may be considered a predefined percentage of total energy available, such as 30%, whereby the predefined, e.g., 30%, threshold results in sufficient remaining battery life or fuel to safely land the aerial vehicle even if one or more complications are involved, such as an unexpected obstacle or an occupied initial landing spot. A more aggressive level of energy depletion may also be user defined, and may be a different predefined percentage, such as 20% or lower, whereby there is little margin for error should issues arise after reaching the predefined, e.g., 20%, battery life threshold.

Embodiments described herein use mission-specific aspects of the computation, such as map features (terrain, objects, etc.) and wind data that may influence the shape of isolines. Factors that are not mission-specific but may be vehicle specific including, for example, aerodynamics, energy use of the motor, or discharge characteristics of the battery may also be considered, but may be used conventionally as typically established through historical use of the vehicle and calculated over time. Isolines as generated herein will illustrate that wind currents will favor flying in a particular direction, and how terrain and no-fly zones influence the cost (e.g., energy cost) of reaching a particular destination.

In order to visualize the points or locations that can be reached using a predetermined amount of energy (fuel or battery), the energy required to reach the locations on the map must first be determined. Embodiments may discretize the area of interest into an X-Y grid and define a routing graph that connects all neighboring nodes or points to each other. The energy required for traveling between neighboring nodes or points may be computed as the Euclidean distance, and then augmented with additional factors. Computing the energy required to travel between two arbitrary nodes may then be established as finding the shortest path between two nodes of the graph. Using a variant of Dijkstra's algorithm, the energy required or cost for the shortest path to each node can then be computed in a single traversal of the graph. FIG. 4 illustrates an example embodiment where isolines have been generated starting at a starting point within the center of the chart and using only Euclidean distance. The chart of FIG. 4 begins with a circle at 10.000% from the center, and continues through 20% and up to 60%. This percentage is the percentage of total battery capacity required to reach each respective line. The circular isolines of FIG. 4 would be accurate in a scenario in which there are no external environmental factors affecting the straight-line flight of an aerial vehicle. However, this is generally not an accurate representation of real-world isolines.

To account for terrain, embodiments described herein may use a rule with regard to altitude. Commercial airplanes fly at altitudes well above any buildings and mountains, such as 30,000 feet, where their altitude relative to sea level does not need to change based on the terrain over which they are flying. Conversely, with very low-altitude aircraft such as that typically flown by UAVs, the terrain may directly affect the altitude at which the UAV flies. For example, a UAV may fly at a predetermined height over the terrain, such as 50 feet. As hills, undulations, and geological features may dramatically affect the height of the terrain, 50 feet above the terrain in a first location may be below ground level at a second location proximate the first location. As such, UAVs may be configured to maintain a constant or relatively constant height above the ground. As such, altitude relative to sea level may fluctuate as a UAV flies over terrain while height relative to the terrain may be maintained. Optionally, a UAV may have a height range above the terrain in which the UAV may operate. For example, a UAV may be configured to fly at between 50 feet and 100 feet above the ground, such that if a UAV is flying at a height of 75 feet above the terrain, and a rise in the terrain of 20 feet is encountered, the UAV may not need to adjust its height as it remains within the range of 50 to 100 feet above the terrain. For embodiments described herein, a substantially constant height over the terrain may be used for determining the isolines with respect to a UAV.

FIG. 5 illustrates an example embodiment of the effect of terrain on the range of an aerial vehicle. As shown, a two-dimensional plot of the terrain is shown in plot 410 including a relatively high elevation hill 420 or obstacle. A three-dimensional plot 430 is shown illustrating a wireframe representation of the terrain including the relatively high elevation hill 440. As shown, the terrain is primarily around zero to 25 feet in altitude while the hill rises to 175 feet in height above the surrounding terrain. The isoline plot 450 illustrates the isolines calculated from origin point 470, with relatively uniform isolines extending in directions that are not toward the hill 460. The isolines as they approach the hill 460 converge as the amount of energy required to maintain a constant elevation above the terrain as the aerial vehicle approaches the peak of the hill 460 increases dramatically. The top of the hill 460 may not be reachable by the aerial vehicle based on the amount of energy required to maintain a substantially constant height above the terrain, while isolines around the hill suggest that the aerial vehicle may fly around the hill 460.

Beyond terrain undulations such as hills, mountains, valleys, canyons, etc., other obstacles may be considered in establishing isolines to accurately represent the dynamic range of an aerial vehicle. No-fly zones such as those around airports or military installations, among other areas, or buildings may be considered and may be distinguished from terrain elevation changes. However, from a computational standpoint, such no-fly zones or very high buildings may be treated as terrain features with prohibitively high elevations, thereby leading the routing algorithm that establishes the isolines to avoid these areas.

The effects of wind on an aerial vehicle may be modeled by changing the energy required or cost to get from one node to a neighboring node. "Airspeed" may describe the aerial vehicle's vector of movement through the air—as effected by the motors and regardless of the wind. "Wind velocity" may describe the additional vector of movement created by the wind. The actual movement relative to the ground may be the sum of the airspeed and wind velocity to produce "ground speed". While an estimate of ground speed may be established based on the combined airspeed of the UAV and the wind velocity, a more accurate estimate may be generated if the aerodynamics of the UAV are available for modeling relative to the wind speed and direction. For example, a UAV with a broad cross section in a direction transverse to the direction of flight and a slim profile in the direction of flight may be substantially affected by crosswinds or components of a wind vector in the crosswind direction, but less impacted by headwinds or tailwinds.

The wind velocity proximate an aerial vehicle may be split into two components: one component that is along the course of the aerial vehicle parallel to the airspeed vector, and one component that is perpendicular to the airspeed vector. The magnitude of both can be computed from the angle between the airspeed vector and the wind velocity vector. If the two are perpendicular, there would be only a deviating effect of the wind velocity on the airspeed such that the wind velocity does not increase or decrease the groundspeed, but does affect the trajectory of the aerial vehicle. FIG. 6 illustrates an example embodiment of the effects of wind velocity on airspeed and the resultant ground speed. The ground speed 510 of the example embodiment of FIG. 6 is faster than the airspeed 520, as the wind velocity 530 has a component in the direction of the airspeed. However, there is additional energy expended by the aerial vehicle to reach the intended destination as the aerial vehicle has to counter the component of the wind velocity that is not in the direction of the airspeed. The additional energy or "cost" in terms of battery energy or fuel is indicated by the "correction" element 540 of FIG. 6.

FIG. 7 illustrates the effect the wind direction and velocity has on the isolines of example embodiments described herein. The direction of the wind velocity of each of the nine charts is illustrated by the arrow within the chart, with the exception of chart 650 which is the baseline illustration of isolines with no wind velocity. As shown, the dynamic range of the aerial vehicle is significantly impacted based on the direction and magnitude of the wind velocity, and example embodiments of the present invention are able to graphically depict the range of the aerial vehicle using isolines to clearly illustrate where the aerial vehicle may travel in increments of energy/fuel consumption. In chart 610, the wind is in a north-west direction expanding the isolines in that direction from the origin. In chart 620, the wind is straight north resulting in isolines ebbing in that direction. Similarly, in charts 630, 640, and 670, the isolines extend in the direction of the wind as the wind aids in flight in those directions, while compressing the isolines in the direction opposite the wind direction. However, in charts 660, 680, and 690, the isolines behave differently since the wind of each of these charts has a component toward an obstacle, 695. These isolines are compressed in a direction opposite the direction of the wind, but are not substantially extended in the direction of the wind since the obstacle 695 is a more significant contributor and larger influence on the range of the aerial vehicle.

In practice, a user or pilot of an aerial vehicle may not be ultimately concerned with which places the aerial vehicle may still reach, but which places the aerial vehicle can reach and still return to a designated landing spot. Embodiments described herein may be configured to dynamically establish such a range including the return travel in a manner similar to that described above. This may be presented to a user in an alternative isoline mode. Computationally, this may be achieved by taking into account the current aerial vehicle position and representing the energy/fuel "cost" required to reach a third location as the sum of the cost of getting from the current location, to the location on the isoline, and back to the third location. FIG. 8 illustrates an example embodiment of such a computation, highlighting that flying from an origin 710 in the direction of the designated return point 720 has a lower overall energy/battery cost than flying away from the designated return point 720. The chart 700 of FIG.

8 is illustrated without the effects of wind velocity for simplicity, though embodiments described herein may be applied equally to scenarios in which wind velocity is a factor. In this manner, the return trip to a designated return point factors in the wind velocity from the destination on the isoline to the designated return point, while also considering the wind velocity in reaching the destination on the isoline from the origin.

Embodiments described herein may also provide an indication to a user of the lowest cost to reach a destination in terms of fuel or energy. In a scenario in which a region includes multiple objects such as buildings, geographic features, or no-fly zones, different paths may be available around different objects or over different terrain elevations to reach a single destination. As illustrated in the example embodiments of FIG. 8, isolines converge on an opposite side of an object from where an aerial vehicle approaches, and taking a first path around an object or sequence of objects may result in reaching the destination within a different isoline than taking an alternative path, which may involve traveling against the wind or having to travel around multiple objects. While the example embodiments of isolines illustrated are relatively simple in nature without converging/overlapping isolines, it is apparent to one of ordinary skill in view of this disclosure that isolines may be caused to overlap by complex geometries of objects and terrain, such that a user may be able to identify the lowest cost path to reach a destination through the isoline depiction on a user interface.

The isolines of example embodiments described herein are generated based on an algorithm that considers wind, terrain, obstacles/buildings, no-fly zones, and the like. The isolines are further based on fuel or energy consumption of the aerial vehicle as established by each aerial vehicle. The isolines are a plot of the furthest reaches to which an aerial vehicle can fly using a predetermined amount or percentage of fuel or energy. The points used to generate the isoline plots may be sparse or dense as appropriate for the terrain and may be more dense where processing capacity is available to process the additional data required to create more points on the isolines. Each point of an isoline may be established based on a most direct or shortest path between the origin or current location of an aerial vehicle and the isoline point. As such, when faced with obstacles, the shortest path may not be a straight line. Further, as terrain elevations change, the isolines may not be in a single plane, but in three-dimensional space at a substantially constant height above the terrain. An isoline point may be a first distance from an origin based on no wind and no elevation changes, where an increase in elevation would cause the distance to be shortened, and a headwind may also cause the distance to be shortened. Conversely, a decrease in elevation or a tailwind may cause the distance to the isoline to be longer.

FIG. 9 illustrates a flowchart of a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems that perform the specified functions, or combinations of special purpose hardware and computer instructions.

FIG. 9 illustrates a flowchart of a method according to an example embodiment of the present invention for the generation of a visualization for dynamic range of an aerial vehicle. As shown at 810, map data including three dimensional terrain map data of a geographic region is received. A location of an aerial vehicle within the geographic region is established at 820. From the location, a plurality of points in a plurality of different directions emanating from the location, such as in each of at least four mutually perpendicular directions that can be reached within at least two predetermined increments of energy consumption are shown at 830. The plurality of different directions emanating from the location are to provide the range of an aerial vehicle in each direction surrounding the vehicle. As such, while embodiments described herein may calculate a plurality of points in a plurality of different directions emanating from a location, those directions may surround or substantially surround the location of the aerial vehicle. Four mutually perpendicular directions may describe four directions emanating from the location having an angle of ninety degrees between each direction. While the directions do not have to be four mutually perpendicular directions, it is understood that the intent is to provide a range distance in all available directions around a vehicle in which they may potentially travel. At 840, a map of the geographic region is provided for display including an isoline through each of the plurality of points for each of the at least two predetermined increments of energy consumption.

In an example embodiment, an apparatus for performing the method of FIG. 9 above may comprise a processor (e.g., the processor 202) configured to perform some or each of the operations (810-840) described above. The processor may, for example, be configured to perform the operations (810-840) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 810-840 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
a memory comprising map data, wherein the map data comprises a three-dimensional terrain map of a geographic region; and
processing circuitry configured to:
determine a location of an aerial vehicle;
calculate a plurality of points in a plurality of different directions emanating from the location that can be reached by the aerial vehicle via a three-dimensional path comprising at least one of a curvilinear or straight line within at least two predetermined increments of energy consumption, wherein the calculation is based, at least in part, on the three-dimensional terrain map and maintaining a constant altitude relative to terrain of the three-dimensional terrain map; and
provide for display of a map of the geographic region including an isoline through each of the plurality of points for each of the at least two predetermined increments of energy consumption representing a dynamic range of the aerial vehicle for the at least two predetermined increments of energy consumption.

2. The mapping system of claim 1, wherein the processing circuitry configured to calculate the plurality of points in the plurality of different directions that can be reached comprises processing circuitry configured to:
discretize the geographic region into a grid of nodes;
define a routing graph that connects all neighboring nodes to each other;
calculate an energy consumption cost of traveling between neighboring nodes; and
determine a plurality of nodes that can be reached via a segmented three-dimensional path based on a cumulative energy consumption cost of the at least two predetermined increments of energy consumption, wherein the plurality of nodes that can be reached by a first predetermined increment of energy are joined as points along a first isoline, and wherein the plurality of nodes that can be reached by a second predetermined increment of energy are joined as points along a second isoline.

3. The mapping system of claim 2, wherein the processing circuitry configured to calculate an energy consumption cost of traveling between neighboring nodes comprises processing circuitry configured to:
compute the Euclidean distance between each neighboring node pair;
calculate the energy consumption cost of traveling between each neighboring node pair along the Euclidean distance;
augment the energy consumption cost of traveling between each neighboring node pair based on a determined wind speed and wind direction proximate the respective neighboring node pair; and
augment the energy consumption cost of traveling between each neighboring node pair based on a determined elevation change between the nodes of a respective neighboring node pair.

4. The mapping system of claim 1, wherein the map data further comprises building information, wherein the three-dimensional terrain map of a geographic region comprises representations of buildings in the geographic region.

5. The mapping system of claim 4, wherein the processing circuitry configured to calculate the plurality of points in the plurality of different directions that can be reached comprises processing circuitry configured to:
determine a height of a building in response to the building being along at least one of the plurality of different directions;
calculate points that can be reached by the aerial vehicle within the at least two predetermined increments of energy consumption based on a path around the building in response to the building being above a predetermined height; and
calculate points that can be reached by the aerial vehicle within the at least two predetermined increments of energy consumption based on a path over the building in response to the building being below a predetermined height.

6. The mapping system of claim 1, wherein the map data further comprises no-fly zone information, wherein the three-dimensional terrain map of the geographic region comprises representations of no-fly zones in the geographic region, and wherein the processing circuitry configured to calculate the plurality of points in the plurality of different directions that can be reached comprises processing circuitry configured to:
calculate points that can be reached by the aerial vehicle within the at least two predetermined increments of energy consumption based on a path around the no-fly zone.

7. The mapping system of claim 1, wherein the processing circuitry configured to calculate the plurality of points in the plurality of different directions that can be reached by the aerial vehicle within at least two predetermined increments of energy consumption comprises processing circuitry configured to:
calculate the plurality of points in the plurality of different directions that can be reached by the aerial vehicle within the at least two predetermined increments of energy consumption based on maintaining a predetermined minimum height above the terrain.

8. The mapping system of claim 1, wherein the processing circuitry configured to calculate the plurality of points in the plurality of different directions that can be reached by the aerial vehicle within at least two predetermined increments of energy consumption comprises processing circuitry configured to:

calculate the plurality of points in the plurality of different directions that can be reached by the aerial vehicle within the at least two predetermined increments of energy consumption by factoring in a return trip from each of the plurality of points to a designated landing location.

9. A computer program product comprising at least one non-transitory computer-readable storage medium having computer-executable program code instructions stored therein, the computer-executable program code instructions comprising program code instructions to:

retrieve map data including a three-dimensional terrain map of a geographic region;

determine a location of an aerial vehicle within the geographic region;

calculate a plurality of points in a plurality of different directions that can be reached by the aerial vehicle via a three-dimensional path comprising at least one of a curvilinear or straight line within at least two predetermined increments of energy consumption, wherein the calculation is based, at least in part, on the three-dimensional terrain map and maintaining a constant altitude relative to terrain of the three-dimensional terrain map; and provide for display of a map of the geographic region including an isoline through the plurality of points for each of the at least two predetermined increments of energy consumption representing a dynamic range of the aerial vehicle for the at least two predetermined increments of energy consumption.

10. The computer program product of claim 9, wherein the program code instructions to calculate the plurality of points in the plurality of different directions that can be reached comprises program code instructions to:

discretize the geographic region into a grid of nodes;

define a routing graph that connects all neighboring nodes to each other;

calculate an energy consumption cost of traveling between neighboring nodes; and determine a plurality of nodes that can be reached via a segmented three-dimensional path based on a cumulative energy consumption cost of the at least two predetermined increments of energy consumption, wherein the plurality of nodes that can be reached by a first predetermined increment of energy are joined as points along a first isoline, and wherein the plurality of nodes that can be reached by a second predetermined increment of energy are joined as points along a second isoline.

11. The computer program product of claim 10, wherein the program code instructions to calculate an energy consumption cost of traveling between neighboring nodes comprises program code instructions to:

compute the Euclidean distance between each neighboring node pair;

calculate the energy consumption cost of traveling between each neighboring node pair along the Euclidean distance;

augment the energy consumption cost of traveling between each neighboring node pair based on a determined wind speed and wind direction proximate the respective neighboring node pair; and augment the energy consumption cost of traveling between each neighboring node pair based on a determined elevation change between the nodes of a respective neighboring node pair.

12. The computer program product of claim 9, wherein the map data further comprises building information, wherein the three-dimensional terrain map of the geographic region comprises representations of buildings in the geographic region.

13. The computer program product of claim 12, wherein the program code instructions to calculate the plurality of points in the plurality of different directions that can be reached comprises program code instructions to:

determine a height of a building in response to the building being along at least one of the plurality of different directions;

calculate points that can be reached by the aerial vehicle within the at least two predetermined increments of energy consumption based on a path around the building in response to the building being above a predetermined height; and calculate points that can be reached by the aerial vehicle within the at least two predetermined increments of energy consumption based on a path over the building in response to the building being below a predetermined height.

14. The computer program product of claim 9, wherein the map data further comprises no-fly zone information, wherein the three-dimensional terrain map of the geographic region comprises representations of no-fly zones in the geographic region, and wherein the program code instructions to calculate the plurality of points in the plurality of different directions that can be reached comprises program code instructions to:

calculate points that can be reached by the aerial vehicle within the at least two predetermined increments of energy consumption based on a path around the no-fly zone.

15. The computer program product of claim 9, wherein the program code instructions to calculate the plurality of points in the plurality of different directions that can be reached by the aerial vehicle within at least two predetermined increments of energy consumption comprises program code instructions to:

calculate the plurality of points in the plurality of different directions that can be reached by the aerial vehicle within at least two predetermined increments of energy consumption based on maintaining a predetermined minimum height above the terrain.

16. The computer program product of claim 9, wherein the program code instructions to calculate the plurality of points in the plurality of different directions that can be reached by the aerial vehicle within at least two predetermined increments of energy consumption comprises program code instructions to:

calculate the plurality of points in the plurality of different directions that can be reached by the aerial vehicle within at least two predetermined increments of energy consumption by factoring in a return trip from the plurality of points to a designated landing location.

17. A method comprising:

receiving map data, wherein the map data comprises a three-dimensional terrain map of a geographic region;

determining a location of an aerial vehicle;

calculating a plurality of points in plurality of different directions that can be reached by the aerial vehicle via a three-dimensional path comprising at least one of a curvilinear or straight line within at least two predetermined increments of energy consumption, wherein the calculation is based, at least in part, on the three-dimensional terrain map and maintaining a constant altitude relative to terrain of the three-dimensional terrain map; and providing for display of a map of the geographic region including an isoline through the plurality of points for each of the at least two predetermined increments of energy consumption representing a dynamic range of the aerial vehicle for the at least two predetermined increments of energy consumption.

18. The method of claim 17, wherein calculating the plurality of points in the at least four directions that can be reached comprises:

discretizing the geographic region into a grid of nodes;

defining a routing graph that connects all neighboring nodes to each other;

calculating an energy consumption cost of traveling between neighboring nodes; and determining a plurality of nodes that can be reached via a segmented three-dimensional path based on a cumulative energy consumption cost of the at least two predetermined increments of energy consumption, wherein the plurality of nodes that can be reached by a first predetermined increment of energy are joined as points along a first isoline, and wherein the plurality of nodes that can be reached by a second predetermined increment of energy are joined as points along a second isoline.

19. The method of claim 18, wherein calculating an energy consumption cost of traveling between neighboring nodes comprises:

computing the Euclidean distance between each neighboring node pair;

calculating the energy consumption cost of traveling between each neighboring node pair along the Euclidean distance;

augmenting the energy consumption cost of traveling between each neighboring node pair based on a determined wind speed and wind direction proximate the respective neighboring node pair; and augmenting the energy consumption cost of traveling between each neighboring node pair based on a determined elevation change between the nodes of a respective neighboring node pair.

20. The method of claim 17, wherein the map data further comprises building information, wherein the three-dimensional terrain map of the geographic region comprises representations of buildings in the geographic region, wherein calculating the plurality of points in the plurality of different directions that can be reached comprises:

determining a height of a building in response to the building being along at least one of the plurality of different directions;

calculating points that can be reached by the aerial vehicle within the at least two predetermined increments of energy consumption based on a path around the building in response to the building being above a predetermined height; and calculating points that can be reached by the aerial vehicle within the at least two predetermined increments of energy consumption based on a path over the building in response to the building being below a predetermined height.

* * * * *